United States Patent
Tang et al.

(10) Patent No.: US 11,307,322 B2
(45) Date of Patent: Apr. 19, 2022

(54) MIXED INVERSION USING A COARSE LAYER MODEL

(71) Applicant: Halliburton Energy Services, Inc., Houston, TX (US)

(72) Inventors: Yumei Tang, Katy, TX (US); Burkay Donderici, Pittsford, NY (US)

(73) Assignee: Halliburton Energy Services, Inc., Houston, TX (US)

( * ) Notice: Subject to any disclaimer, the term of this patent is extended or adjusted under 35 U.S.C. 154(b) by 436 days.

(21) Appl. No.: 16/325,998

(22) PCT Filed: Sep. 19, 2016

(86) PCT No.: PCT/US2016/052548
§ 371 (c)(1),
(2) Date: Feb. 15, 2019

(87) PCT Pub. No.: WO2018/052456
PCT Pub. Date: Mar. 22, 2018

(65) Prior Publication Data
US 2021/0041590 A1    Feb. 11, 2021

(51) Int. Cl.
*G01V 3/28* (2006.01)
*G06F 30/20* (2020.01)
(Continued)

(52) U.S. Cl.
CPC .............. *G01V 3/28* (2013.01); *E21B 49/00* (2013.01); *G01V 3/38* (2013.01); *G06F 30/20* (2020.01);
(Continued)

(58) Field of Classification Search
CPC ............. G01V 3/28; G01V 3/38; E21B 49/00
(Continued)

(56) References Cited

U.S. PATENT DOCUMENTS 4,524,325 A * 6/1985 Moore ............... G01V 3/24 324/375
5,428,293 A * 6/1995 Sinclair ............... G01V 3/28 324/335
(Continued)

FOREIGN PATENT DOCUMENTS

WO    2016108913 A1    7/2016

OTHER PUBLICATIONS

Gajda-Zagorska et al. (A hybrid method for inversion of 3D DC resistivity logging Measurements, Nat Comput (2015) 14:355-374) (Year: 2015).*
(Continued)

*Primary Examiner* — Iftekhar A Khan
(74) *Attorney, Agent, or Firm* — Delizio, Peacock

(57) ABSTRACT

A look-ahead logging method includes obtaining an initial resistivity log. The method further includes deriving an initial formation model based on the initial resistivity log. The method further includes estimating deep resistivity measurements from the initial formation model and deriving a reduced-complexity formation model from the estimated deep resistivity measurements. The method further includes collecting actual resistivity measurements and inverting the actual resistivity measurements, using the reduced-complexity formation model, to obtain look-ahead or look-around parameter values. The method further includes displaying the look-ahead or look-around parameter values or storing the look-ahead or look-around parameter values on a non-transient information storage medium.

20 Claims, 5 Drawing Sheets

(51) Int. Cl.
*E21B 49/00* (2006.01)
*G01V 3/38* (2006.01)
*G06F 111/10* (2020.01)

(52) U.S. Cl.
CPC ....... *E21B 2200/20* (2020.05); *G06F 2111/10* (2020.01)

(58) Field of Classification Search
USPC .......................................................... 703/10
See application file for complete search history.

(56) References Cited

U.S. PATENT DOCUMENTS

| | | | | |
|---|---|---|---|---|
| 5,663,499 | A * | 9/1997 | Semmelbeck | G01V 3/38 166/250.02 |
| 5,878,372 | A * | 3/1999 | Tabarovsky | G06F 17/12 702/7 |
| 5,900,733 | A * | 5/1999 | Wu | G01V 3/30 324/338 |
| 7,093,672 | B2 * | 8/2006 | Seydoux | G01V 3/28 175/24 |
| 8,085,050 | B2 * | 12/2011 | Bittar | G01V 3/28 324/339 |
| 9,551,806 | B2 * | 1/2017 | Le | G01V 3/28 |
| 9,664,028 | B2 * | 5/2017 | Donderici | G01V 3/38 |
| 10,024,104 | B2 * | 7/2018 | Wu | E21B 7/022 |
| 2003/0028325 | A1 * | 2/2003 | Roggero | G01V 11/00 702/11 |
| 2004/0154831 | A1 * | 8/2004 | Seydoux | E21B 7/04 175/24 |
| 2005/0075789 | A1 * | 4/2005 | Xiao | G01V 11/00 702/6 |
| 2005/0256645 | A1 * | 11/2005 | Rabinovich | G01V 3/28 702/7 |
| 2006/0011385 | A1 * | 1/2006 | Seydoux | G01V 3/28 175/61 |
| 2009/0085570 | A1 * | 4/2009 | Signorelli | G01V 3/28 324/338 |
| 2009/0160449 | A1 * | 6/2009 | Martinez | H01Q 1/04 324/343 |
| 2010/0156424 | A1 * | 6/2010 | Bittar | G01V 3/28 324/339 |
| 2011/0068798 | A1 * | 3/2011 | Minerbo | G01V 3/28 324/343 |
| 2013/0144529 | A1 * | 6/2013 | Seydoux | G01V 3/20 702/7 |
| 2013/0213714 | A1 * | 8/2013 | Fulda | G01V 3/30 175/50 |
| 2013/0261975 | A1 * | 10/2013 | Yang | G01V 3/28 702/10 |
| 2014/0249754 | A1 * | 9/2014 | Donderici | E21B 7/04 702/7 |
| 2014/0350858 | A1 * | 11/2014 | Donderici | G01V 3/38 702/7 |
| 2015/0241596 | A1 * | 8/2015 | Donderici | G01V 13/00 324/338 |
| 2015/0300150 | A1 * | 10/2015 | Burkay | E21B 47/125 340/853.6 |
| 2015/0309201 | A1 * | 10/2015 | Wu | G01V 3/38 324/334 |
| 2015/0330190 | A1 * | 11/2015 | Wu | E21B 47/12 703/6 |
| 2015/0369950 | A1 * | 12/2015 | Wu | G01V 3/30 702/7 |
| 2015/0369952 | A1 * | 12/2015 | Wu | G01V 3/30 702/7 |
| 2016/0097240 | A1 * | 4/2016 | Ren | E21B 21/001 175/5 |
| 2016/0109614 | A1 * | 4/2016 | Wu | G01V 3/28 702/7 |
| 2017/0075021 | A1 * | 3/2017 | Thiel | G01V 3/38 |
| 2017/0306741 | A1 * | 10/2017 | Martakov | G01V 3/30 |
| 2018/0058211 | A1 * | 3/2018 | Liang | G01V 1/282 |
| 2018/0179879 | A1 * | 6/2018 | Ma | E21B 44/00 |
| 2021/0055448 | A1 * | 2/2021 | Thiel | G01V 3/18 |

OTHER PUBLICATIONS

PCT Application Serial No. PCT/US2016/052548, International Search Report, dated Jul. 12, 2017, 3 pages.
PCT Application Serial No. PCT/US2016/052548, International Written Opinion, dated Jul. 12, 2017, 5 pages.

* cited by examiner

MIXED INVERSION USING A COARSE LAYER MODEL

BACKGROUND

In the oil and gas industry, resistivity logging is performed to provide an indication of the electrical resistivity of rock formations surrounding an earth borehole. Such information is useful in ascertaining the presence or absence of hydrocarbons. A typical resistivity logging tool includes a transmitter antenna and a pair of receiver antennas located at different distances from the transmitter antenna along the axis of the tool. The transmitter antenna is used to create electromagnetic fields in the surrounding formation. In turn, the electromagnetic fields in the formation induce an electrical voltage in each receiver antenna. Due to geometric spreading and absorption by the surrounding earth formation, the induced voltages in the two receiving antennas have different phases and amplitudes. Experiments have shown that the phase difference ($\Phi$) and amplitude ratio (attenuation, A) of the induced voltages in the receiver antennas are indicative of the resistivity of the formation.

Geosteering is the intentional directional control of a well based on the results of logging measurements. Geosteering may be used to reach a target, keep a directional wellbore within a pay zone, avoid obstacles, and the like. In mature areas, geosteering may be used to keep a wellbore in a particular section of a reservoir to minimize gas or water breakthrough and maximize economic production from the well. The success or failure of geosteering depends on the accuracy of the logs used to inform geosteering decisions; however, if accuracy were maximized, even simple geosteering decisions would span the length of days due to processing time, resulting in an unacceptable waste of resources.

Often, an inversion process is employed to derive the formation parameters from the resistivity tool measurements. In an inversion process, the tool measurements are compared to synthetic measurements derived from a parameterized formation model, and the model parameters are adjusted until a match is achieved. The most useful models strike a balance between simplicity and accuracy. Accurate inversions generally require some minimum level of complexity that renders their use infeasible in at least some situations (e.g., real time monitoring). Simpler models may provide significantly reduced computational demands at the cost of accuracy. It is difficult to achieve an optimal balance.

BRIEF DESCRIPTION OF THE DRAWINGS

Accordingly, systems and methods using a coarse layer model for mixed inversion purposes are disclosure herein. In the following detailed description of the various disclosed embodiments, reference will be made to the accompanying drawings in which.

Figure 1:
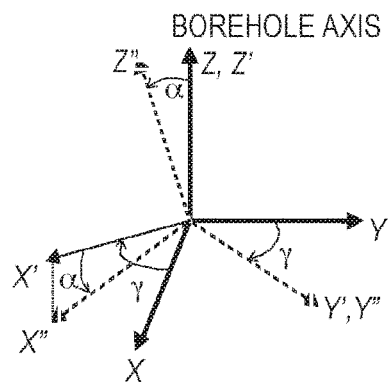
FIG. 1 is a diagram showing a relationship between illustrative coordinate axes of a borehole and a formation bed.

It should be understood, however, that the specific embodiments given in the drawings and detailed description below do not limit the disclosure. On the contrary, they provide the foundation for one of ordinary skill to discern the alternative forms, equivalents, and other modifications that are encompassed in the scope of the appended claims.

NOTATION AND NOMENCLATURE

Certain terms are used throughout the following description and claims to refer to particular system components and configurations. As one of ordinary skill will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or a direct electrical or physical connection. Thus, if a first device couples to a second device, that connection may be through a direct electrical connection, through an indirect electrical connection via other devices and connections, through a direct physical connection, or through an indirect physical connection via other devices and connections in various embodiments.

DETAILED DESCRIPTION

Figure 2:
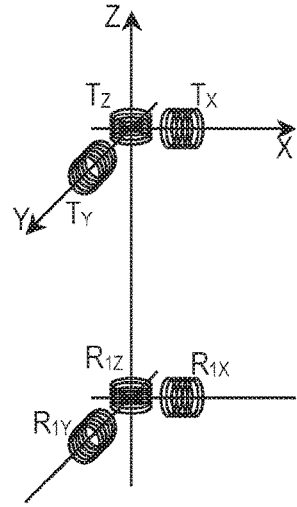
FIG. 2 is a diagram showing an illustrative orthogonal triad antenna arrangement for an electromagnetic logging tool.

The issues identified in the background are at least partly addressed by systems and methods using a coarse layer model for mixed inversion purposes. FIG. 1 illustrates the relationship between coordinate axes of a borehole and a dipping formation bed. Specifically, the two coordinate systems are related via two rotations. The borehole has a coordinate system defined in accordance with the borehole's long axis (the Z-axis) and the north side (or alternatively, the high side) of the hole (the X-axis). The formation, when characterized as a plane, has a coordinate system defined in accordance with the normal to the plane (the Z"-axis) and the direction of steepest descent (the X"-axis). Beginning with the borehole's coordinate system (X,Y,Z), a first rotation of angle $\gamma$ is made about the Z-axis. The resulting coordinate system is denoted (X',Y',Z'). Angle $\gamma$ is the relative strike angle, which indicates the direction of the formation dip relative to the borehole's coordinate system. A second rotation of angle $\alpha$ is then made about the Y' axis to align with the formation coordinate system. Angle $\alpha$ is the relative dip angle, which is the slope angle of the beds relative to the long axis of the borehole. Using these rotations, measurements from tools within the borehole, such as resistivity tools, may be oriented to facilitate the creation of formation models from the measurements. FIG. 2 illustrates the operation of a representative resistivity tool.

FIG. 2 shows a representative antenna configuration for a multi-component electromagnetic resistivity logging tool.

(The electromagnetic resistivity logging tool may be embodied as a wireline tool or as a LWD tool.) A triad of transmitter coils $T_X$, $T_Y$, and $T_Z$, each oriented along a respective axis, is provided. At least one triad of similarly oriented receiver coils $R_X$, $R_Y$, and $R_Z$ is also provided at some distance from the transmitter triad. The magnetic field h in the receiver coils can be represented in terms of the magnetic moments m at the transmitters and a coupling matrix C:

$$h = mC \quad (1)$$

In express form, equation (1) is:

$$[H_x \ H_y \ H_z] = [M_x \ M_y \ M_z] \begin{bmatrix} C_{xx} & C_{xy} & C_{xz} \\ C_{yx} & C_{yy} & C_{zz} \\ C_{zx} & C_{zy} & C_{zz} \end{bmatrix}, \quad (2)$$

where $M_X$, $M_Y$, and $M_Z$ are the magnetic moments (proportional to transmit signal strength) created by transmitters $T_X$, $T_Y$, and $T_Z$, respectively. $H_X$, $H_Y$, and $H_Z$ are the magnetic fields (proportional to receive signal strength) at the receiver antennas $R_X$, $R_Y$, and $R_Z$, respectively.

In the antenna configuration of FIG. 2, if each transmitter is fired in turn, and signal measurements are made at each receiver in response to each firing, nine signal measurements are obtained. These nine measurements enable the determination of a complete coupling matrix C. ($C_{IJ} = a_{IJ} V_{IJ}$, where I is the index for transmitter $T_X$, $T_Y$, or $T_Z$, J is the index for receiver $R_X$, $R_Y$, or $R_Z$, $a_{IJ}$ is a constant determined by the tool design, and $V_{IJ}$ is a complex value representing the signal amplitude and phase shift measured by receiver J in response to the firing of transmitter I.) Knowledge of the complete coupling matrix as a function of position along the borehole, frequency, and antenna spacing enables the determination of bed boundary locations and resistivities, dip angle, strike angle, vertical resistivity, and horizontal resistivity as further described below with respect to FIG. 3A.

Figure 3A:
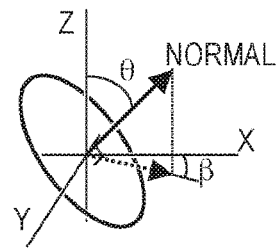
FIG. 3A is a diagram showing illustrative angles for defining the orientation of a tilted antenna.

FIG. 3A shows two angles that may be used to specify the orientation of a tilted coil antenna. The tilted coil antenna may be considered as residing in a plane having a normal vector. Tilt angle θ is the angle between the longitudinal axis of the tool and the normal vector. Azimuth angle β is the angle between the projection of the normal vector in the X-Y plane and the tool scribe line. Alternatively, in the downhole context, azimuthal angle β may represent the angle between projection of the normal vector in the X-Y plane and the X-axis of the borehole coordinate system.

The signal measured by a tilted receiver in response to the firing of a tilted transmitter can be expressed in terms of the signals $V_{IJ}$. When both transmitter and receiver coils are oriented at the same azimuth angle β, the tilted receiver signal $V_R$ is $$V_R(\beta) = \begin{bmatrix} \sin\theta_T \cos\beta \\ \sin\theta_T \sin\beta \\ \cos\theta_T \end{bmatrix}^T \begin{bmatrix} V_{xx} & V_{yx} & V_{zx} \\ V_{xy} & V_{yy} & V_{zy} \\ V_{xz} & V_{yz} & V_{zz} \end{bmatrix} \begin{bmatrix} \sin\theta_R \cos\beta \\ \sin\theta_R \sin\beta \\ \cos\theta_R \end{bmatrix} \quad (3)$$

where $\theta_T$ is the tilt angle of the transmitter and $\theta_R$ is the tilt angle of the receiver. The received signal may be expressed as:

$$V_R(\beta) = \left[\left(\frac{C_{xx}}{2} - \frac{C_{yy}}{2}\right)\cos 2\beta + \left(\frac{C_{yx} + C_{xy}}{2}\right)\sin 2\beta\right] + \quad (4)$$
$$[(C_{zx} + C_{xz})\cos\beta + (C_{zy} + C_{yz})\sin\beta] +$$
$$\left(C_{zz} + \frac{C_{xx}}{2} + \frac{C_{yy}}{2}\right)$$
$$= V_{double}(\beta) + V_{single}(\beta) + V_{const}$$

meaning that $$\begin{cases} V_{double}(\beta) = \left(\frac{C_{xx}}{2} - \frac{C_{yy}}{2}\right)\cos 2\beta + \left(\frac{C_{yx} + C_{xy}}{2}\right)\sin 2\beta \\ V_{single}(\beta) = (C_{zx} + C_{xz})\cos\beta + (C_{zy} + C_{yz})\sin\beta \\ V_{const} = C_{zz} + \frac{C_{xx}}{2} + \frac{C_{yy}}{2} \end{cases} \quad (5)$$

where $$\begin{cases} C_{xx} = V_{xx}\sin\theta_t\sin\theta_r; & C_{yx} = V_{yx}\sin\theta_t\sin\theta_r; & C_{zx} = V_{zx}\cos\theta_t\sin\theta_r \\ C_{xy} = V_{xy}\sin\theta_t\sin\theta_r; & C_{yy} = V_{yy}\sin\theta_t\sin\theta_r; & C_{zy} = V_{zy}\cos\theta_t\sin\theta_r \\ C_{xz} = V_{xz}\sin\theta_t\cos\theta_r; & C_{yz} = V_{yz}\sin\theta_t\cos\theta_r; & C_{zz} = V_{zz}\cos\theta_t\cos\theta_r \end{cases} \quad (6)$$

Sinusoidal curve fitting may be applied to the received signal to extract the (summed) coefficients in equation (5). The measurements of a second tilted receiver's response to the tilted transmitter provides an additional set of measurements that enables the individual $C_{IJ}$ (or equivalently, the $V_{IJ}$) values to be obtained. (Note that in most cases $V_{xy}$ may be assumed equal to $V_{yx}$, but the same is not true for the other cross components.) As an example, consider $\theta_t = \theta_{r2} = \theta_c$ and $\theta_{r1} = -\theta_{r2}$, with the receivers R1 and R2 collocated at a distance $d_1$ from the transmitter. The zz coupling component can be written as $$V_{zz}(d_1) = \frac{V_{r1\_const} + V_{r2\_const}}{2\cos^2\theta_c} \quad (7a)$$

where $V_{r1\_const}$ is the constant complex voltage $V_{const}$ from equation (4) associated with receiver R1, and $V_{r2\_const}$ is the corresponding value for receiver R2. Along similar lines, the xx and yy components can be written as:

$$V_{xx}(d_1) = \frac{(V_{r1\_const} - V_{r2\_const}) + (V_{r1\_double\_cos} - V_{r2\_double\_cos})}{2\sin^2\theta_c} \quad (7b)$$

$$V_{yy}(d_1) = \frac{(V_{r1\_const} - V_{r2\_const}) - (V_{r1\_double\_cos} - V_{r2\_double\_cos})}{2\sin^2\theta_c} \quad (7c)$$

The cross components can be written as:

$$V_{xy}(d_1) = V_{yx}(d_1) = \frac{V_{r1\_double\_sin} - V_{r2\_double\_sin}}{2\sin^2\theta_c} \quad (8a)$$

$$V_{yz}(d_1) = \frac{V_{r1\_single\_sin} + V_{r2\_single\_sin}}{2\cos\theta_c\sin\theta_c} \quad (8b)$$

$$V_{zy}(d_1) = \frac{V_{r1\_single\_sin} - V_{r2\_single\_sin}}{2\cos\theta_c\sin\theta_c} \quad (8c)$$

$$V_{xz}(d_1) = \frac{V_{r1\_single\_cos} + V_{r2\_single\_cos}}{2\cos\theta_c\sin\theta_c} \quad (8d)$$

-continued $$V_{zx}(d_1) = \frac{V_{r1\_single\_cos} - V_{r2\_single\_cos}}{2\cos\theta_c \sin\theta_c} \quad (8e)$$

Figure 3B:
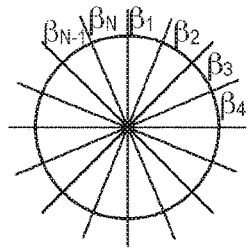
FIG. 3B is a diagram showing illustrative azimuthal bins around a borehole circumference.

FIG. 3B shows a division of the borehole circumference into n bins, each bin corresponding to a range of azimuthal angle values. A representative (e.g., average) azimuthal angle is associated with each bin. Tilted antenna measurements may be associated with the bin containing the azimuthal angle for that antenna, the angle (and corresponding bin) changing as the tool rotates. Although three transmitter antenna orientations and three receiver antenna orientations are employed in the antenna configuration of FIG. 2, when tool rotation is exploited, it is possible to determine the full coupling matrix with only one transmitter and two receiver antenna orientations (or equivalently, one receiver and two transmitter antenna orientations). Of course, more transmitter and/or receiver antennas can be employed and may be helpful for producing more robust measurements as described below.

Figure 4:
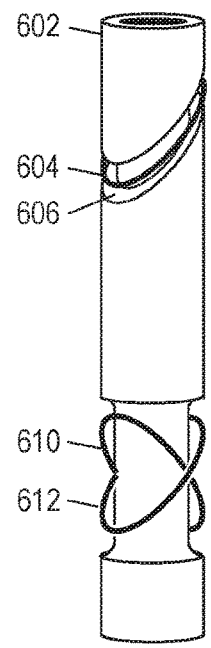
FIG. 4 is a side view of an illustrative electromagnetic logging tool having tilted transmit and receive antennas.

FIG. 4 shows an electromagnetic resistivity logging tool 602 having only two receiver antenna orientations. The tool 602 is provided with one or more regions 606 of reduced diameter. A wire coil 604 is placed in the region 606 and in some embodiments is spaced away from the surface of the tool 602 by a constant distance. To mechanically support and protect the coil 604, a non-conductive filler material (not shown) such as epoxy, rubber, or ceramic may be used in the reduced diameter regions 606. Coil 604 is a transmitter coil, and coils 610 and 612 are receiving coils, though these roles can be reversed in view of the principle of reciprocity. In operation, transmitter coil 604 transmits an interrogating electromagnetic signal which propagates through the surrounding formation. Receiver coils 610, 612 detect the interrogating electromagnetic signal and provide a measure of the electromagnetic signal's amplitude attenuation and phase shift. For differential measurements, additional receiver coils parallel to coils 610, 612 may be provided at an axially-spaced distance. From the absolute or differential amplitude attenuation and phase shift measurements, the coupling matrix components can be determined and used as the basis for determining formation parameters, creating formation models, and geosteering.

The average depth of investigation (as defined by a radial distance from the tool axis) to which a resistivity measurement pertains is a function of the frequency of the transmitter and the distance from the transmitter to the mid-point between the two receivers. Thus, one may achieve multiple radial depths of investigation of resistivity either by providing multiple transmitters at different distances from the receiver pair or by operating a single transmitter at multiple frequencies. In this way, shallow and deep resistivity measurements may be obtained. In some embodiments, the transmitter coil 604 is spaced approximately 30 inches from the receiver coils 610, 612. The additional receiver coils may be positioned approximately 8 inches further from the transmitter coil. The transmitter and receiver coils may comprise as little as one loop of wire, although more loops may provide additional signal power. The distance between the coils and the tool surface is preferably in the range from $\frac{1}{16}$ inch to $\frac{3}{4}$ inch, but may be larger. Transmitter coil 604 and receiver coil 612 may each have a tilt angle of about 45° and aligned with the same azimuth angle, while receiver coil 610 may have a tilt angle of about 45° and an azimuth 180° apart from receiver coil 612 (or equivalently, a tilt angle of minus 45° at the same azimuth angle as receiver coil 612).

In a deep formation detection application, downhole tools are able to determine formation parameters ahead of the bit ("look ahead") and surrounding the bit ("look around") with a very deep detection range. Consequently, corresponding formation inversion results at a certain depth within the wellbore can actually be the basis of formation models that are not penetrated by the wellbore. Owing to said deep detection capability, field operators can utilize such models, illustrated in FIG. 5, to make better decisions for geosteering among other things.

Figure 5:
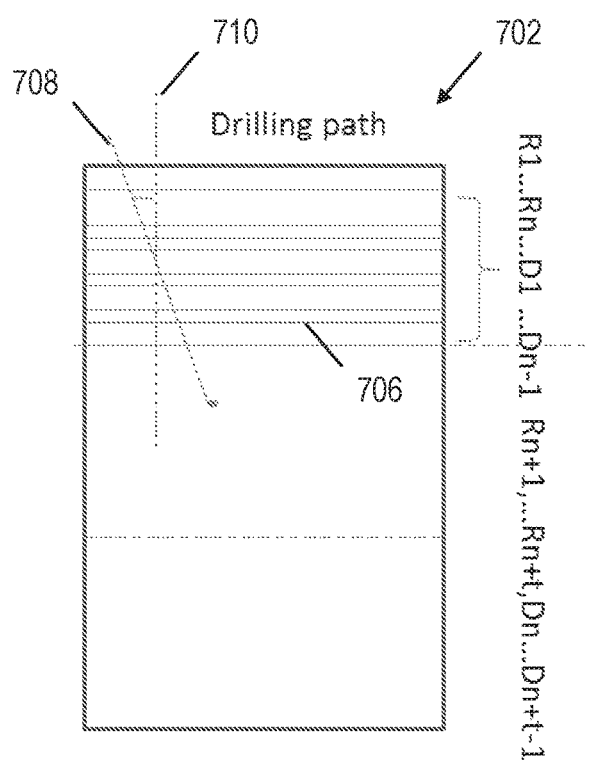
FIG. 5 includes two illustrative volumetric models: one fine-layer model and one equivalent coarse-layer model.
Figure 5:
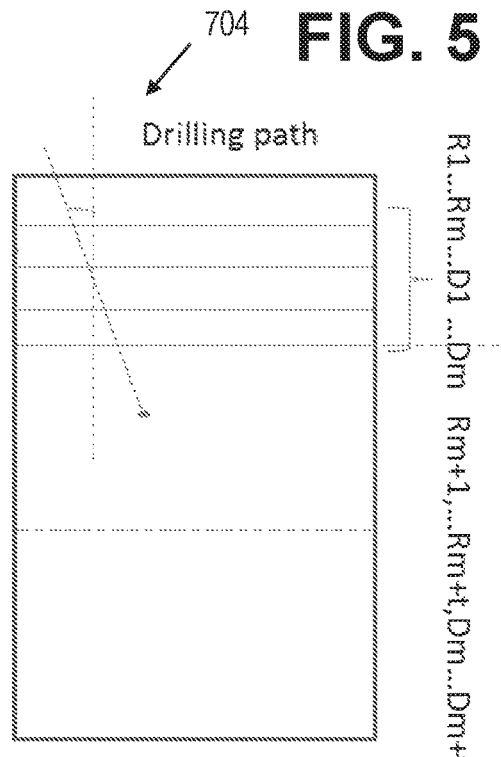

FIG. 5 illustrates two volumetric layered models. Specifically, a fine-layer model 702 may be replaced with an equivalent coarse-layer model 704 by obtaining the formation resistivity for a number of "current" layers (around the current location of a tool downhole) and, using the inversion methods discussed below, determine the characteristics of a number of look ahead and/or look around layers just outside of the tool's detection range. The coarse-layer model 704 achieves an optimal balance between complexity and accuracy for use in geosteering applications, which require real-time feedback and decision making.

The formation layer boundaries are represented by horizontal lines 702, the borehole is represented by a slanted line 708, and the vertical is represented by a dashed line 710. The fine-layer model 702 may include layers less than 1 foot high. Generally, in a fine-layer model 702 set for inversion, a vector $\vec{X}\in\{R_1, \ldots R_n D_1 \ldots D_{n-1}, \text{dip} \ldots\}$ represents formation parameters such as resistivity, boundary position, and relative dip angle for n layers of the formation. An initial guess for the vector may be written as: $\vec{X}_0\in\{R_{10}, \ldots R_{n0} D_{10} \ldots D_{(n-1)0}, \text{dip}_0\}$. The initial guess may be randomly set, set using offset well information, or set using LWD measurements.

Figure 6:
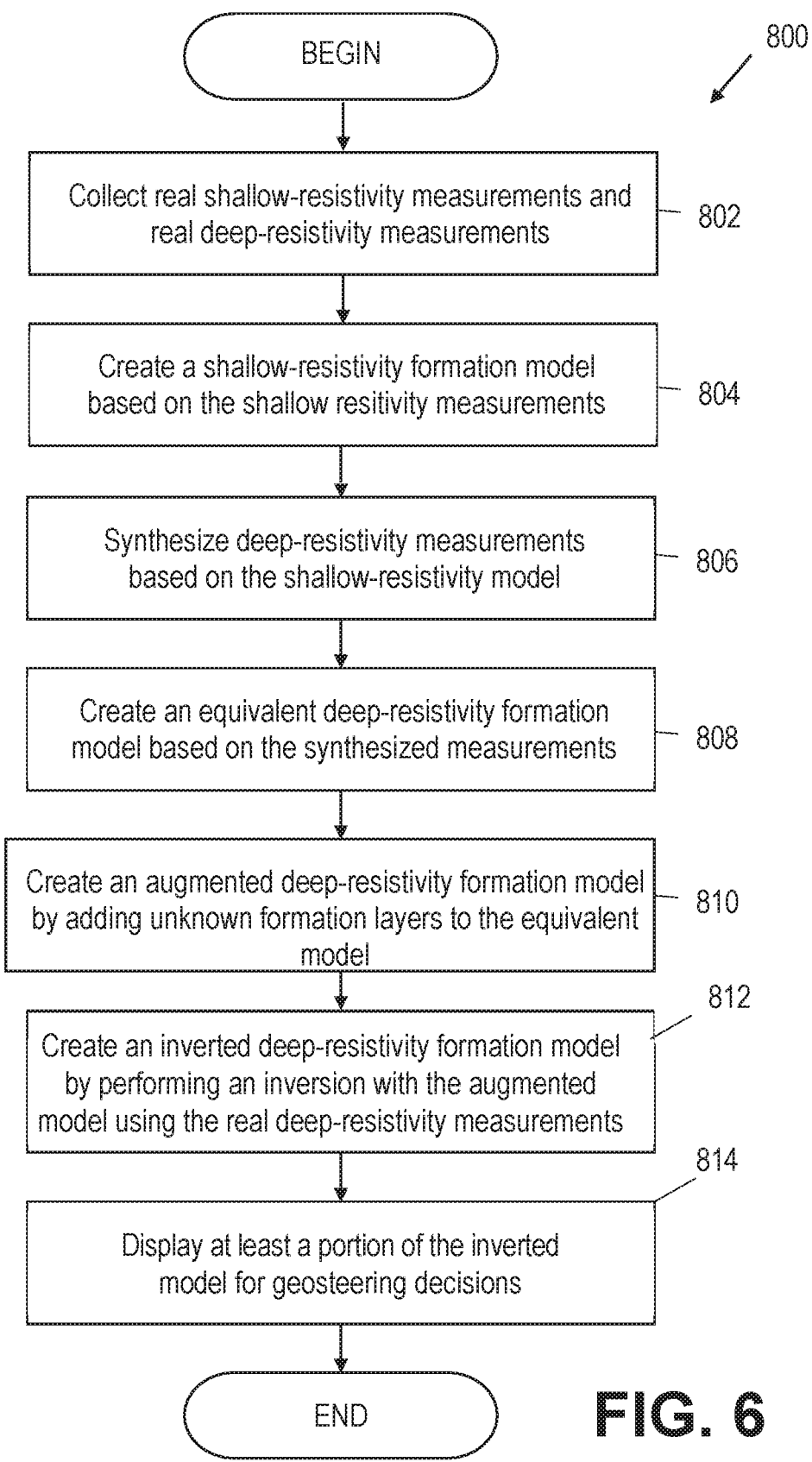
FIG. 6 is a first flow diagram of an illustrative method of creating a coarse-layer formation model.
Figure 7:
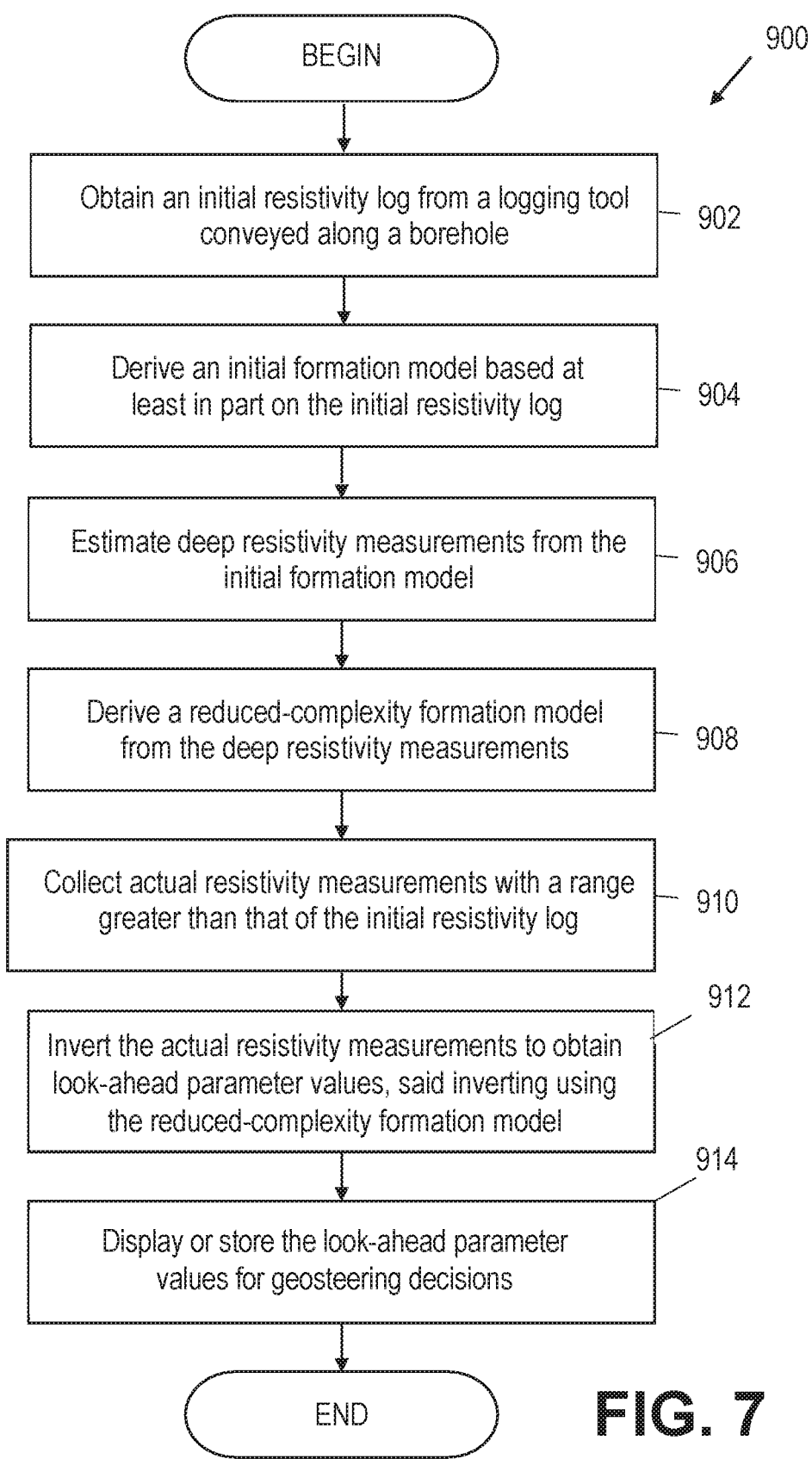
FIG. 7 is a second flow diagram of an illustrative logging method using a coarse-layer model.

During the inversion, the number of fine layers in the resultant model may be set randomly, based on experience, or based on a guess and check method. During the inversion, a cost function equation is defined based on the difference between a simulation result from modeling the resistivity data and measurements from the tool. In at least one embodiment, the cost function is defined as $C=\|(\vec{S}-\vec{M})\|$, where the $\|\ \|$ operator is the $L_2$ norm of the difference (misfit) vector, $\vec{S}$ is the simulation result (i.e., the vector of predicted tool measurements) from modeling the resistivity data, and $\vec{M}$ is the vector of actual measurements from the tool. Next, the cost function is minimized for the formation parameters, and the model is updated More iterations of minimizing the cost function are performed until the parameters converge. The iteration can be implemented using a least squares method, the Marquardt-Levenberg method, the Gauss-Newton method, and the like. FIGS. 6 and 7 describe how such an inversion process may be implemented at several points to create the equivalent coarse-layer model 704, which is appropriate for geosteering use. Here, the simulation result, $\vec{S}$, and the actual measurements, $\vec{M}$, may be the components as described in Equations (7) and (8). In the case of $\vec{M}$, $V_R(\beta)$ may be obtained from measurements corresponding to different azimuth angles, $\beta$, and associated components may be calculated using Equations (4)-(8). Drilling rotation may be utilized to facilitate measurements at different azimuth angles, $\beta$. In the case of $\vec{S}$, $V_R(\beta)$ may be obtained from simulations corresponding to different azimuth angles, $\beta$, formation parameters, $\vec{X}$, and associated components may be calculated using Equations (4)-(8). When the cost function, C, is calculated, simulation result, $\vec{S}$, and actual measurements, $\vec{M}$, may be constructed corresponding to each component $V_{xx}(d_1)$ to $V_{zz}(d_1)$ or the real and imaginary parts associated with these components.

FIG. 6 is a flow diagram of an illustrative method 800 of creating a formation model using the systems and tools discussed above. At 802, the system collects real (i.e. not derived or synthesized) shallow-resistivity measurements and real deep-resistivity measurements. For example, a resistivity tool 602 may use a transmitter 604 and a first receiver antenna 610 at a first axial distance from the transmitter 604 to collect the shallow-resistivity measurements. The tool 602 may use a second receiver antenna 612 at a second axial distance from the transmitter 604 to collect real deep-resistivity measurements, the second axial distance being greater than the first axial distance. The transmitter 604 and receivers 610, 612 may be tilted antennas, and the resistivity tool 602 may be used in a logging-while-drilling environment or a wireline environment. The horizontal and vertical resistivities of the formation layers near the tool may be measured as the tool 602 is conveyed along the borehole.

At 804, the system creates a shallow-resistivity formation model based on the shallow-resistivity measurements. For example, one or more processors in the system (uphole, downhole, or both working in concert) may model the formation by inverting the collected shallow-resistivity measurements to produce a fine n-layer model 702. The processors may store the model 702 in memory.

At 806, the system synthesizes deep-resistivity measurements based on the shallow-resistivity model 702 created from real shallow-resistivity measurements. Specifically, the shallow-resistivity model may be used to create a shallow-resistivity log by interpolating the data between the measurement points. Based on such interpolation, characteristics of the deeper formation may be extrapolated to form a synthesized deep-resistivity log. Specifically, the same relationships that govern the interpolated data will govern the extrapolated data.

At 808, the system creates an equivalent deep-resistivity formation model based on the synthesized deep-resistivity measurements. Specifically, the synthesized deep-resistivity measurements are inverted to produce an m-layer equivalent coarse model, where m is less than n and the height of the layers in the coarse model is greater than the height of the layers in the fine model. By decreasing the number of layers, processing and computation time for decisions based on the model is decreased. Reduction in the number of layers may be achieved by utilizing an initial formation model with fewer layers for inversion. Reduction in the number of layers may also be achieved after inversion by averaging the resistivities of layers within a certain percentage threshold of each other and replacing those layers with a single layer having the average resistivity. Such a threshold may be 2% to 30%.

At 810, the system creates an augmented deep-resistivity formation model by adding unknown formation layers to the equivalent deep-resistivity model. The unknown formation layers may be look-around layers (radially deeper than the range of the tool, and sometimes extensions of nearby layers), look-ahead layers (further down the borehole than the range of the tool), or both.

At 812, the system creates an inverted deep-resistivity formation model 704 by performing an inversion with the augmented deep-resistivity formation model. Specifically, the real deep-resistivity measurements (collected at 802) are inverted to solve for the unknown look-ahead and/or look-around layers in the augmented deep-resistivity formation model.

At 814, a display device such as a monitor, printer, or the like displays at least a portion of the inverted deep-resistivity formation model 704. The deep-resistivity formation model may be used for geosteering decisions. For example, the difference between the upward and downward looking responses (sometimes referred to herein as the "response difference") indicates whether the tool 602 is approaching a zone of higher or lower resistivity than the present zone. If the response difference is increasingly positive, the response difference indicates that the tool is approaching a zone of higher resistivity (i.e., about to enter a potential payzone). On the other hand, if the response difference is increasingly negative, the response difference indicates that the tool is approaching a zone of lower resistivity (i.e., about to exit a payzone). Because the response difference can be measured before the tool 602 actually enters the next bed, the drilling operator has the opportunity to change the drilling parameters so that the borehole will remain in the desired payzone.

By incorporating synthesized deep-resistivity measurements, real deep-resistivity measurements, and a deep formation models into the method 800, the resultant inverted deep-resistivity formation model 704 strikes an optimal balance between complexity and accuracy, and may be used to inform geosteering decisions.

FIG. 7 is a flow diagram of an illustrative logging method 900 using the systems and tools described above. At 902, the system obtains an initial resistivity log from a logging tool conveyed along a borehole. For example, the logging tool may include a resistivity tool 602 that collects formation resistivity measurements as it is conveyed along a borehole. These measurements may be compiled into a resistivity log as a function of position along the borehole.

At 904, the system derives an initial formation model based at least in part on the initial resistivity log. For example, an n-layer formation model may be produced by inverting the resistivity measurements. The reduced-complexity formation model may include layers with anisotropic resistivity, and the initial formation model may include layers with isotropic resistivity. Conversely, the reduced-complexity formation model may include layers with anisotropic resistivity, and initial formation model may include layers with anisotropic resistivity.

At 906, the system estimates deep resistivity measurements from the initial formation model. For example, a forward modeling process may be performed on the initial formation model to estimate the deep resistivity measurements. The deep resistivity measurements are associated with a measurement range greater than that of the initial resistivity log.

At 908, the system derives a reduced-complexity formation model from the estimated deep resistivity measurements. For example, a higher number of finer formation layers, n, in the initial formation model may be replaced with a lower number of coarser formation layers, m, by inverting the deep-resistivity measurements. The reduced-complexity formation model may include unknown look-ahead layers or look-around layers. Reduction in the number of layers may be achieved by utilizing an initial formation model with fewer layers for inversion. Reduction in the number of layers may also be achieved after inversion by averaging the resistivities of layers within a certain percentage threshold of each other and replacing those layers with a single layer having the average resistivity. Such a threshold may be 2% to 30%.

At 910, the system collects actual resistivity measurements with a range greater than that of the initial resistivity log. For example, the tool may be repositioned within the borehole or another combination of transmitters and receivers, having a greater range, may be used to collect the measurements.

At 912, the system inverts the actual resistivity measurements, using the reduced-complexity formation model, to obtain the look-ahead or look-around parameter values. At 914, the system stores the look-ahead or look-around parameter values. For example, the values may be stored on a non-transient information storage medium. Furthermore a display device such as a monitor, printer, or the like may display the look-ahead or look-around parameter values for use in geosteering decisions as described with respect to FIG. 6. In an alternative embodiment, the values are not displayed, but used automatically, i.e. without human input, to steer the bit within the formation.

Figure 8:
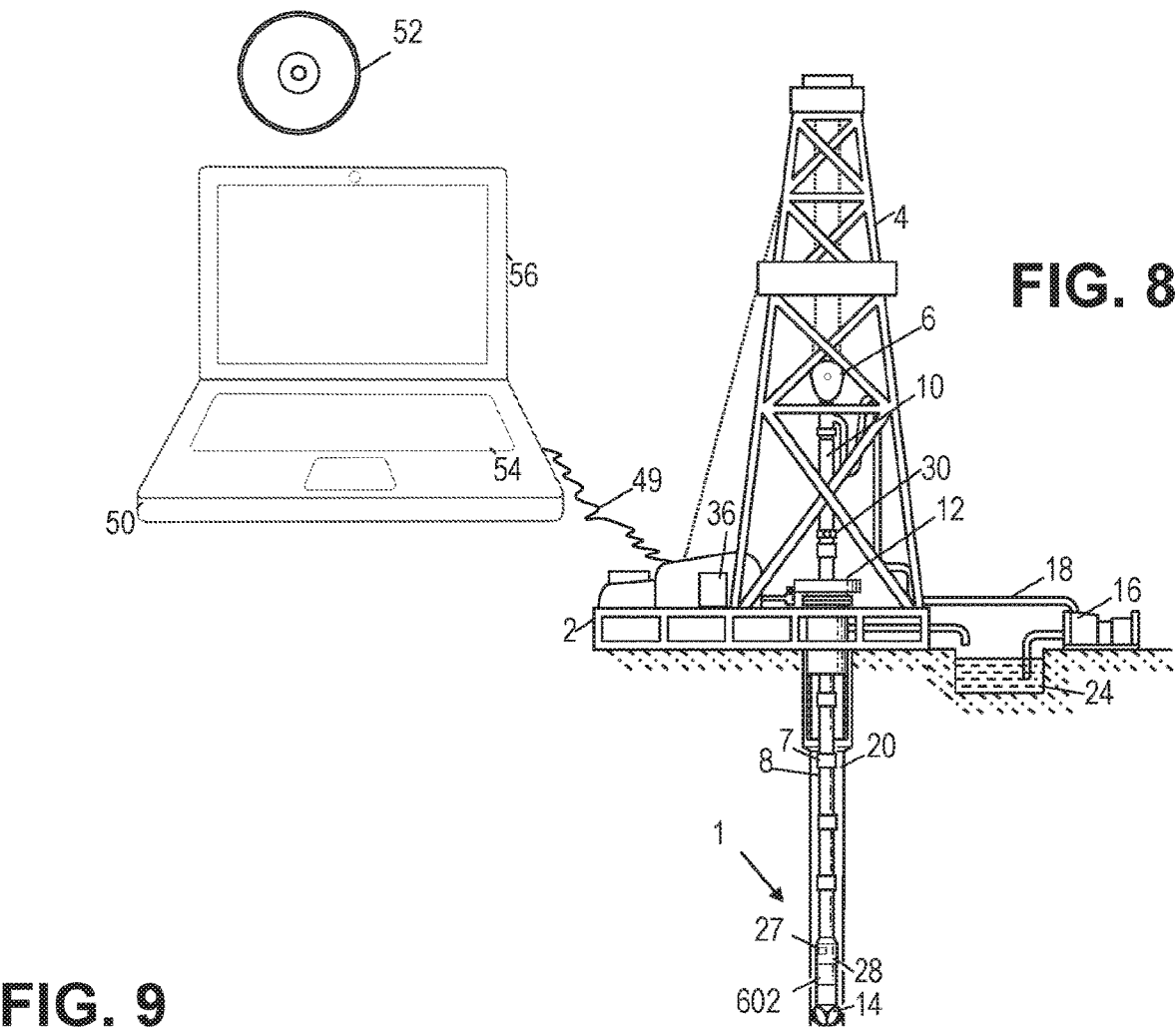
FIG. 8 is a contextual view of an illustrative logging while drilling environment.

The disclosed systems and methods are best understood in terms of the context in which they are employed. As such, FIG. 8 shows a well during drilling operations that includes a system 1 for mixed inversion using a coarse-layer model including a resistivity tool 602 and one or more processors 27 (located downhole as shown, at the surface, or both). A drilling platform 2 is equipped with a derrick 4 that supports a hoist 6. In at least some embodiments, the platform 2 is located offshore for subsea drilling. Drilling of oil and gas wells is carried out by a string of drill pipes connected together by "tool" joints 7 so as to form a drill string 8. The hoist 6 suspends a kelly 10 that lowers the drill string 8 through a rotary table 12. Connected to the lower end of the drill string 8 is a drill bit 14. The bit 14 is rotated and drilling of the borehole 20 is accomplished by rotating the drill string 8, by use of a downhole motor near the drill bit, or by both methods.

Drilling fluid, termed mud, is pumped by mud recirculation equipment 16 through a supply pipe 18, through the kelly 10, and down through the drill string 8 at high pressures and volumes to emerge through nozzles or jets in the drill bit 14. The mud then travels back up the hole via the annulus formed between the exterior of the drill string 8 and the borehole wall 20, through a blowout preventer, and into a mud pit 24 on the surface. On the surface, the drilling mud is cleaned and then recirculated by recirculation equipment 16.

For a logging-while-drilling ("LWD") environment, downhole sensors are located in the drillstring 8 near the drill bit 14. The sensors may include directional instrumentation and LWD tools such as a resistivity tool with tilted antennas for detecting bed boundaries. The directional instrumentation measures the inclination angle, the horizontal angle, and the azimuthal angle (also known as the rotational or "tool face" angle) of the LWD tools. As is commonly defined in the art, the inclination angle is the deviation from vertically downward, the horizontal angle is the angle in a horizontal plane from true North, and the tool face angle is the orientation (rotational about the tool axis) angle from the high side of the well bore. In some embodiments, directional measurements are made as follows: a three axis accelerometer measures the Earth's gravitational field vector relative to the tool axis and a point on the circumference of the tool called the "tool face scribe line." (The tool face scribe line is drawn on the tool surface as a line parallel to the tool axis.) From this measurement, the inclination and tool face angle of the LWD tool can be determined. Additionally, a three axis magnetometer measures the Earth's magnetic field vector in a similar manner From the combined magnetometer and accelerometer data, the horizontal angle of the LWD tool can be determined. In addition, a gyroscope or other form of inertial sensor may be incorporated to perform position measurements and further refine the orientation measurements. The position and orientation measurements may be associated with the resistivity data collected by the resistivity tool 602, and in at least one embodiment the downhole sensors are included in the resistivity tool 602. Geosteering signals can be derived from the azimuthal variations to enable steering relative to bed boundaries.

In some embodiments, the downhole sensors are coupled to a telemetry transmitter 28 that transmits telemetry signals by modulating the mud flow in the drill string 8. A telemetry receiver 30 is coupled to the kelly 10 to receive transmitted telemetry signals. Other telemetry transmission techniques may also be used. The receiver 30 communicates the telemetry to an acquisition module 36 coupled to a data processing system 50.

The data processing system 50 may be coupled to a measurement unit on the platform 2 by a wired connection 49 or wireless connection, and may periodically obtain measurement data from the measurement unit as a function of position and/or time. Among other things, the system 50 processes data received from the acquisition module 36 and generates a representative display for the driller to perceive. For example, formation models created from the resistivity data may be displayed. Software (represented by information storage media 52) may run on the data processing system 50 to collect the data and organize it in a file or database stored on non-transient information storage media. Specifically, a processor coupled to memory may execute the software. The software may respond to user input via a keyboard 54 or other input mechanism to display data as an image or movie on a monitor 56 or other output mechanism such as a printer. The software may process the data to optimize field operations. For example, the resistivity data may be processed to create a coarse-layer model of the formation as described below. In at least one embodiment, the data processing system 50 is located downhole within a housing able to protect the system 50 from the harsh downhole environment. In another embodiment, processors both at the surface and downhole may work together or independently to obtain, store, and process measurement data.

Figure 9:
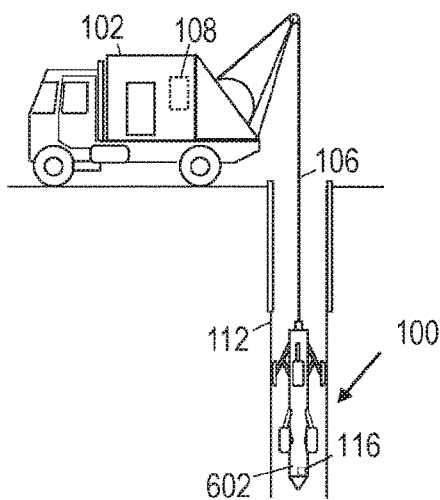
FIG. 9 is a contextual view of an illustrative wireline logging environment.

FIG. 9 shows a contextual view of an illustrative wireline embodiment that includes a system 100 for mixed inversion using a coarse-layer model including a resistivity tool 602 and one or more processors 116 (located downhole, at the surface, or both). A logging truck 102 may suspend a wireline logging tool, such as the resistivity tool 602, on a wireline cable 106 having conductors for transporting power to the tool 602 and telemetry from the tool 602 to the surface. The tool 602 may include depth sensors, temperature sensors, pressure sensors, and the like that collect downhole measurements including resistivity data. On the surface, a computer 108 acquires and stores measurement data from the tool 602 as a function of axial position along the borehole 112 and optionally as a function of azimuth. Though shown as an integrated part of the logging truck 102, the computer 108 can take different forms including a tablet computer, laptop computer, desktop computer, and virtual cloud computer, and the computer 108 executes software to carry out necessary processing and enable a user to view and interact with a display of the resulting information. Specifically, a processor coupled to memory and located at the surface may execute the software. The software may collect the data and organize it in a file or database stored on non-transient information storage media, and the software may respond to user input via a keyboard or other input mechanism to display data as an image or movie on a monitor or other output mechanism such as a printer. Furthermore, the software may process the data to optimize field operations. For example, the resistivity data may be processed to create a coarse-layer model of the formation as described below. In this way, a multi-dimensional representation of the surrounding formation may be obtained, processed, and displayed. In addition, the software may issue an audio or visual alert to direct the user's attention to a particular location, result, or piece of data. In at least one embodiment, the tool 602 itself may include the processor coupled with memory to obtain, store, and process measurement data downhole. In another embodiment, processors both at the surface and downhole may work together or independently to obtain, store, and process measurement data. The borehole may be skewed within the formation and/or the formation may dip relative to the Earth's surface.

Using the systems, tools, and methods described above enables landing a well without need for a pilot well, geosteering to increase well productivity, geostopping to avoid dangerous situations such as a blow-out, and the like. A fast and accurate estimation of the shallow, deep, and upcoming formation parameters enable correct decisions, which results in time and cost savings.

In some aspects, systems, methods, and apparatuses are provided according to one or more of the following embodiments. In at least one embodiment, a look-ahead logging method includes obtaining an initial resistivity log from a logging tool conveyed along a borehole. The method further includes deriving an initial formation model based at least in part on the initial resistivity log. The method further includes estimating deep resistivity measurements from the initial formation model. The deep resistivity measurements are associated with a measurement range greater than that of the initial resistivity log. The method further includes deriving a reduced-complexity formation model from the estimated deep resistivity measurements. The method further includes collecting actual resistivity measurements with a range greater than that of the initial resistivity log. The method further includes inverting the actual resistivity measurements, using the reduced-complexity formation model, to obtain look-ahead or look-around parameter values. The method further includes displaying the look-ahead or look-around parameter values or storing the look-ahead or look-around parameter values on a non-transient information storage medium.

In another embodiment, a system for creating an inverted deep-resistivity formation model includes a transmitter and a first receiver antenna at a first axial distance from the transmitter. The first receiver antenna collects real shallow-resistivity measurements. The system further includes a second receiver antenna at a second axial distance from the transmitter. The second receiver antenna collects real deep-resistivity measurements, and the second axial distance is greater than the first axial distance. The system further includes one or more processors coupled to the first and second receiver antennas. The one or more processors obtain an initial resistivity log and derive an initial formation model based at least in part on the initial resistivity log. The one or more processors estimate deep resistivity measurements from the initial formation model. The deep resistivity measurements are associated with a measurement range greater than that of the initial resistivity log. The one or more processors derive a reduced-complexity formation model from the estimated deep resistivity measurements. The one or more processors collect actual resistivity measurements with a range greater than that of the initial resistivity log. The one or more processors invert the actual resistivity measurements, using the reduced-complexity formation model, to obtain look-ahead or look-around parameter values.

In another embodiment, a method of creating an inverted deep-resistivity formation model includes synthesizing deep-resistivity measurements based on a shallow-resistivity model created from real shallow-resistivity measurements. The method further includes creating an equivalent deep-resistivity formation model based on the synthesized deep-resistivity measurements. The method further includes creating an augmented deep-resistivity formation model by adding unknown formation layers to the equivalent deep-resistivity model. The method further includes creating an inverted deep-resistivity formation model by performing an inversion on the augmented deep-resistivity formation model. The method further includes displaying at least a portion of the inverted deep-resistivity formation model.

The following features may be incorporated into the various embodiments described above, such features incorporated either individually or in conjunction with one or more of the other features. Deriving the reduced-complexity formation model may include replacing a higher number of finer formation layers in the initial formation model with a lower number of coarser formation layers. The reduced-complexity formation model may include look-ahead layers or look-around layers. The reduced-complexity formation model may include layers with anisotropic resistivity, and the initial formation model may include layers with isotropic resistivity. The reduced-complexity formation model may include layers with anisotropic resistivity, and initial formation model may include layers with anisotropic resistivity. Estimating deep resistivity measurements may include performing a forward modeling process. The look-ahead or look-around parameter values may be used for geosteering decisions. A resistivity tool may include the transmitter, first receiver antenna, and second receiver antenna. The resistivity tool may include the one or more processors. The one or more processors may be distributed among a downhole resistivity tool and a computer located at the surface. The inverted deep-resistivity formation model may be based on real deep-resistivity measurements. The inverted deep-resistivity formation model may be based on the real shallow-resistivity measurements. The deep-resistivity formation model may be used for geosteering decisions.

While the present disclosure has been described with respect to a limited number of embodiments, those skilled in the art will appreciate numerous modifications and variations therefrom. It is intended that the appended claims cover all such modifications and variations.

What is claimed is:

1. A look-ahead logging method that comprises:
obtaining an initial resistivity log from a logging tool conveyed along a borehole;
deriving an initial formation model based at least in part on the initial resistivity log;
estimating deep resistivity measurements from the initial formation model, the deep resistivity measurements associated with a measurement range greater than that of the initial resistivity log;
deriving a reduced-complexity formation model from the estimated deep resistivity measurements, wherein the reduced-complexity formation model includes a lower number of coarser formation layers compared to the a higher number of finer formation layers included in the initial formation model;

collecting actual resistivity measurements with a range greater than that of the initial resistivity log;

inverting the actual resistivity measurements to obtain look-ahead or look-around parameter values, said inverting using the reduced-complexity formation model; and displaying the look-ahead or look-around parameter values or storing the look-ahead or look-around parameter values on a non-transient information storage medium.

2. The method of claim 1, wherein deriving the reduced-complexity formation model comprises replacing the higher number of finer formation layers in the initial formation model with the lower number of coarser formation layers.

3. The method of claim 1, wherein the reduced-complexity formation model comprises look-ahead layers or look-around layers.

4. The method of claim 1, wherein the reduced-complexity formation model comprises layers with anisotropic resistivity, and the initial formation model comprises layers with isotropic resistivity.

5. The method of claim 1, wherein the reduced-complexity formation model comprises layers with anisotropic resistivity, and initial formation model comprises layers with anisotropic resistivity.

6. The method of claim 1, wherein estimating deep resistivity measurements comprises performing a forward modeling process.

7. The method of claim 1, further comprising using the look-ahead or look-around parameter values for geosteering decisions.

8. A system for creating an inverted deep-resistivity formation model comprising:
   a transmitter;
   a first receiver antenna at a first axial distance from the transmitter, wherein the first receiver antenna collects real shallow-resistivity measurements;
   a second receiver antenna at a second axial distance from the transmitter, wherein the second receiver antenna collects real deep-resistivity measurements and wherein the second axial distance is greater than the first axial distance; and
   one or more processors coupled to the first and second receiver antennas, wherein the one or more processors:
      obtain an initial resistivity log;
      derive an initial formation model based at least in part on the initial resistivity log;
      estimate deep resistivity measurements from the initial formation model, the deep resistivity measurements associated with a measurement range greater than that of the initial resistivity log;
      derive a reduced-complexity formation model from the estimated deep resistivity measurements, wherein the reduced-complexity formation model includes a lower number of coarser formation layers compared to the a higher number of finer formation layers included in the initial formation model;
      collect actual resistivity measurements with a range greater than that of the initial resistivity log; and
      invert the actual resistivity measurements to obtain look-ahead or look-around parameter values, said inverting using the reduced-complexity formation model.

9. The system of claim 8, wherein deriving the reduced-complexity formation model causes the one or more processors to replace the higher number of finer formation layers in the initial formation model with the lower number of coarser formation layers.

10. The system of claim 8, wherein the reduced-complexity formation model comprises look-ahead layers or look-around layers.

11. The system of claim 8, wherein estimating deep resistivity measurements causes the one or more processors to perform a forward modeling process.

12. The system of claim 8, wherein the one or more processors are further caused to use the look-ahead parameter values for geosteering decisions.

13. The system of claim 8, wherein a resistivity tool comprises the transmitter, first receiver antenna, and second receiver antenna.

14. The system of claim 13, wherein the resistivity tool comprises the one or more processors.

15. The system of claim 13, wherein the one or more processors are distributed among a downhole resistivity tool and a computer located at the surface.

16. A method of creating an inverted deep-resistivity formation model comprising:
   synthesizing deep-resistivity measurements based on a shallow-resistivity model created from real shallow-resistivity measurements;
   creating an equivalent deep-resistivity formation model based on the synthesized deep-resistivity measurements;
   creating an augmented deep-resistivity formation model by adding unknown formation layers to the equivalent deep-resistivity model;
   creating an inverted deep-resistivity formation model by performing an inversion on the augmented deep-resistivity formation model; and
   displaying at least a portion of the inverted deep-resistivity formation model.

17. The method of claim 16, wherein creating the equivalent deep-resistivity formation model comprises replacing a higher number of finer formation layers in the shallow-resistivity model with a lower number of coarser formation layers.

18. The method of claim 16, wherein synthesizing the deep-resistivity measurements comprises performing a forward modeling process.

19. The method of claim 16, wherein the inverted deep-resistivity formation model is based on real deep-resistivity measurements.

20. The method of claim 19, wherein the inverted deep-resistivity formation model is based on the real shallow-resistivity measurements.

* * * * *